United States Patent
Qi et al.

(10) Patent No.: US 10,122,817 B2
(45) Date of Patent: *Nov. 6, 2018

(54) METHODS AND ARRANGEMENTS FOR DEVICE PROFILES IN WIRELESS NETWORKS

(71) Applicants: Emily H Qi, Gig Harbor, WA (US); Minyoung Park, Portland, OR (US)

(72) Inventors: Emily H Qi, Gig Harbor, WA (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,699

(22) Filed: Dec. 27, 2014

(65) Prior Publication Data

US 2015/0256643 A1    Sep. 10, 2015

Related U.S. Application Data

(63) Continuation of application No. 13/977,700, filed as application No. PCT/US2011/068255 on Dec. 30, 2011.

(Continued)

(51) Int. Cl.
　*G06F 17/30*　　(2006.01)
　*H04L 29/08*　　(2006.01)
　*H04L 29/06*　　(2006.01)

(52) U.S. Cl.
　CPC ...... *H04L 67/303* (2013.01); *G06F 17/30147* (2013.01); *H04L 69/324* (2013.01); *H04L 69/22* (2013.01)

(58) Field of Classification Search
　None
　See application file for complete search history.

(56) References Cited

U.S. PATENT DOCUMENTS 7,454,517 B2　11/2008　Ha et al.
7,539,769 B2　　5/2009　McGuire
(Continued)

FOREIGN PATENT DOCUMENTS

CN　　　1838626 A　　9/2006
CN　　101355479 A　　1/2009
(Continued)

OTHER PUBLICATIONS

International Search Report and Written Opinion received for PCT Patent Application No. PCT/US2011/068255, dated Sep. 27, 2012, 10 pages.
(Continued)

*Primary Examiner* — Uyen Le (57) ABSTRACT

Embodiments provide a device profile mechanism for wireless devices. Many embodiments comprise a medium access control (MAC) sublayer logic to build frames comprising a device profile index element for a first device. Embodiments may facilitate access by a second device to a device profile for the first device without communication of the entire device profile from the first device. In some embodiments, the second device may access a storage medium integrated with or accessible to the second device to determine the device profile. Some embodiments may store the device profile index element in memory, in logic, or in another manner that facilitates transmission of the device profile index element in frames. Some embodiments may receive and detect communications with the device profile index element. Further embodiments may generate and transmit a communication with the device profile index element.

20 Claims, 7 Drawing Sheets

Related U.S. Application Data (60) Provisional application No. 61/532,362, filed on Sep. 8, 2011.

(56) References Cited

U.S. PATENT DOCUMENTS

| | | | |
|---|---|---|---|
| 7,852,768 B1* | 12/2010 | Pannell | H04L 12/24 370/235 |
| 8,024,492 B2* | 9/2011 | Syed | G01D 4/004 710/15 |
| 8,392,602 B2 | 3/2013 | VanGompel | |
| 8,768,256 B2* | 7/2014 | Dua | G06F 17/30058 340/10.51 |
| 2005/0010671 A1 | 1/2005 | Grannan | |
| 2005/0074025 A1* | 4/2005 | Shao | H04W 74/0808 370/461 |
| 2006/0009861 A1 | 1/2006 | Bonasia et al. | |
| 2006/0215621 A1 | 9/2006 | Abdel-Kader et al. | |
| 2007/0160082 A1* | 7/2007 | Un | H04L 1/0043 370/469 |
| 2009/0029650 A1* | 1/2009 | Shon | H04L 1/188 455/68 |
| 2009/0310572 A1* | 12/2009 | Wang | H04J 3/0697 370/336 |
| 2010/0020746 A1 | 1/2010 | Zaks | |
| 2010/0103910 A1 | 4/2010 | Verma | |
| 2011/0128947 A1* | 6/2011 | Liu | H04L 25/03343 370/338 |
| 2011/0194644 A1 | 8/2011 | Liu et al. | |
| 2011/0320588 A1* | 12/2011 | Raleigh | H04W 36/245 709/224 |
| 2012/0323381 A1 | 12/2012 | Yadav et al. | |
| 2016/0073252 A1* | 3/2016 | Spencer | H04W 8/22 709/224 |

FOREIGN PATENT DOCUMENTS

| | | |
|---|---|---|
| CN | 101453378 A | 6/2009 |
| CN | 101945360 A | 1/2011 |
| CN | 101977167 A | 2/2011 |
| EP | 2498527 A1 | 9/2012 |
| JP | 1996211905 A | 8/1996 |
| JP | 9-149034 A | 6/1997 |
| JP | 2004-78570 A | 3/2004 |
| JP | 2011-30033 A | 2/2011 |
| JP | 2011-90500 A | 5/2011 |
| JP | 2012-523774 A | 10/2012 |
| JP | 2013-510472 A | 3/2013 |
| JP | 2013-514011 A | 4/2013 |
| KR | 10-2007-0111289 A | 11/2007 |
| WO | 2001/97482 A1 | 12/2001 |
| WO | 2010/056944 A2 | 5/2010 |
| WO | 2011/072173 A2 | 6/2011 |
| WO | 2013/036274 A1 | 3/2013 |

OTHER PUBLICATIONS

International Preliminary Report on Patentability received for Patent Application No. PCT/US2011/068255, dated Mar. 20, 2014, 7 pages.
Extended European Search Report received for European Patent Application No. 11872003.6, dated Mar. 30, 2015, 6 pages.
Office Action received for Japanese Patent Application No. 2014-529701, dated Jan. 20, 2015, 2 pages of English Translation and 2 pages of Japanese Office Action.
Notice of Allowance received for Japanese Patent Application No. 2014-529701, dated Aug. 25, 2015, 3 pages.
Office Action received for Korean Patent Application No. 2014-7009176, dated May 18, 2015, 4 pages of English Translation and 5 pages of Korean Office Action.
Notice of Allowance received for Korean Patent Application No. 10-2014-7009176, dated Dec. 8, 2015, 2 pages of Korean Notice of Allowance and 1 page of English Translation.
Office Action received for Japanese Patent Application No. 2015-187052, dated Sep. 6, 2016, 3 pages of Japanese Office Action and 2 pages of English Translation.
Office Action received for Japanese Patent Application No. 2015-187052, dated Mar. 28, 2017, 3 pages of Japanese Office Action and 3 pages of English Translation.
Canpolat et al.,"Proposal for Service Advertisement, Network Discovery & Selection", IEEE 802.11-08/01128r0, Sep. 10, 2008, 7 pages.
Office Action and Search Report received for Chinese Patent Application No. 201180074729.8, dated Apr. 21, 2016, 18 pages of Chinese Office Action and 24 pages of English Translation.
Office Action received for Chinese Patent Application No. 201180074729.8, dated Feb. 16, 2017, 19 pages of Chinese Office Action including 21 pages of English Translation.
Notice of Allowance received for Chinese Patent Application No. 201180074729.8, dated Jun. 30, 2017, 2 pages of Chinese Office Action and 3 pages of English Translation.
Chandrasekaran et al., Detecting Identity Spoofs in IEEE 802.11e Wireless Networks:, IEEE "GLOBECOM" 2009 Proceedings, 6 pages.

\* cited by examiner

| DEVICE CATEGORY AND DEVICE TYPE TABLE 1100 | | | |
|---|---|---|---|
| DEVICE CATEGORY INDEX | DESCRIPTION | DEVICE TYPE INDEX | DESCRIPTION |
| ...00 | PERSONAL COMPUTER | ...F0<br>...01<br>...<br>... | DESKTOP<br>GAME STATION<br>HOME THEATER<br>WORKSTATION<br>... |
| ...A1 | PERSONAL MOBILE DEVICES | ...D1<br>...C4<br>...<br>...<br>... | LAPTOP<br>NETBOOK<br>SMART PHONE<br>TABLET<br>... |
| ...02 | DISPLAY UNITS | ...B9<br>...<br>...<br>... | MONITOR<br>TELEVISION<br>WEATHER STATION<br>... |
| ...C3 | CONSUMER ELECTRONICS | ...A8<br>...<br>...<br>... | ALARM CLOCK<br>DVR<br>WATCH<br>... |
| ...05 | SENSOR DEVICES | ...D2<br>...<br>...<br>... | APPLIANCE MONITOR<br>SECURITY MONITOR<br>SMART GAS METER<br>SMART WATER METER<br>... |

FIG. 1D

| DEVICE PROFILES TABLE 1200 | | | | | | | | |
|---|---|---|---|---|---|---|---|---|
| DEVICE CAT INDEX | DEVICE TYPE INDEX | BSS MAX IDLE PERIOD | AP PROXY | | | TRAFFIC PATTERN | | |
| | | | PROXY ARP | KEEP ALIVE | OTHER | TFS TCLAS/ TSPEC | FMS TCLAS/ TSPEC | DMS TCLAS/ TSPEC | OTHER TCLAS/ TSPEC |

METHODS AND ARRANGEMENTS FOR DEVICE PROFILES IN WIRELESS NETWORKS

BACKGROUND

Embodiments are in the field of wireless communications. More particularly, embodiments are in the field of communications protocols between wireless transmitters and receivers.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments provide a device profile mechanism for wireless communications devices. Many embodiments comprise a medium access control (MAC) sublayer logic to build frames comprising a device profile index element for a first communications device. In several embodiments, the MAC sublayer logic may implement a device profile index element in the frame body of an association frame and a reassociation frame. Embodiments may facilitate access by a second communications device to a device profile for the first communications device without communication of the entire device profile from the first communications device. In some embodiments, the second communications device may access a storage medium integrated with or accessible to the second communications device to determine the device profile. Several embodiments comprise a data structure comprising at least one device profile that is accessible based upon indexes indicative of a device category and a device type and included in the device profile index element. Some embodiments may store the device profile index element in memory, in logic, or in another manner that facilitates transmission of the device profile index element in frames. Some embodiments may receive and detect communications with the device profile index element. Further embodiments may generate and transmit a communication with the device profile index element.

Some embodiments comprise Internet of Things (IoT) devices. IoT is referred to Thing-to-Thing connections via the Internet. IoT devices may take advantage of Wireless Fidelity (Wi-Fi) network ubiquity, enabling new applications that often require very low power consumption, among other unique characteristics. Wi-Fi generally refers to devices that implement the Institute of Electrical and Electronic Engineers (IEEE) IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2007.pdf) and other related wireless standards.

In addition to traditional mobile devices (Laptop, Smart Phone, Tablet, and the like), the IoT devices may include sensors, meters, controls, instruments, monitors, appliances, and the like. These devices may require a deeply embedded wireless connection, may not have any visual controls or display function, and may require several years of battery life.

Some embodiments employ IEEE 802.11v systems. The IEEE 802.11v systems may comprise a set of network infrastructure assisted power saving features that allow client devices to sleep for longer periods while still performing essential functions. These features, however, are primarily designed for mobile devices that are general personal devices and have comprehensive user interfaces. Unlike personal devices, IoT devices may be designed to perform specific functions and may have limited in resources (e.g. memory). Thus, several embodiments implement a device profile mechanism to facilitate of the power saving features defined for IEEE 802.11v devices in IoT devices with limited memory and limited user interface capabilities.

Some embodiments implement a device profile mechanism to simplify configuration and communication of Wi-Fi embedded devices when the Wi-Fi embedded devices are using, for example, IEEE 802.11v power saving features, including BSS Max Idle Period, Traffic Filter Service, Flexible Multicast Service and Directed multicast service. Further embodiments implement a device profile mechanism for any Quality of Service (QoS) related traffic classification (TCLAS) or traffic specification (TSPEC) setting. According to some embodiments, new device profiles may be building blocks of the Ultra Low Power technology, which may enable small battery-powered wireless devices (e.g., sensors) to use Wi-Fi to connect to the Internet with a longer or extended communications range.

Further embodiments may provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, IEEE 802.11-2007, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
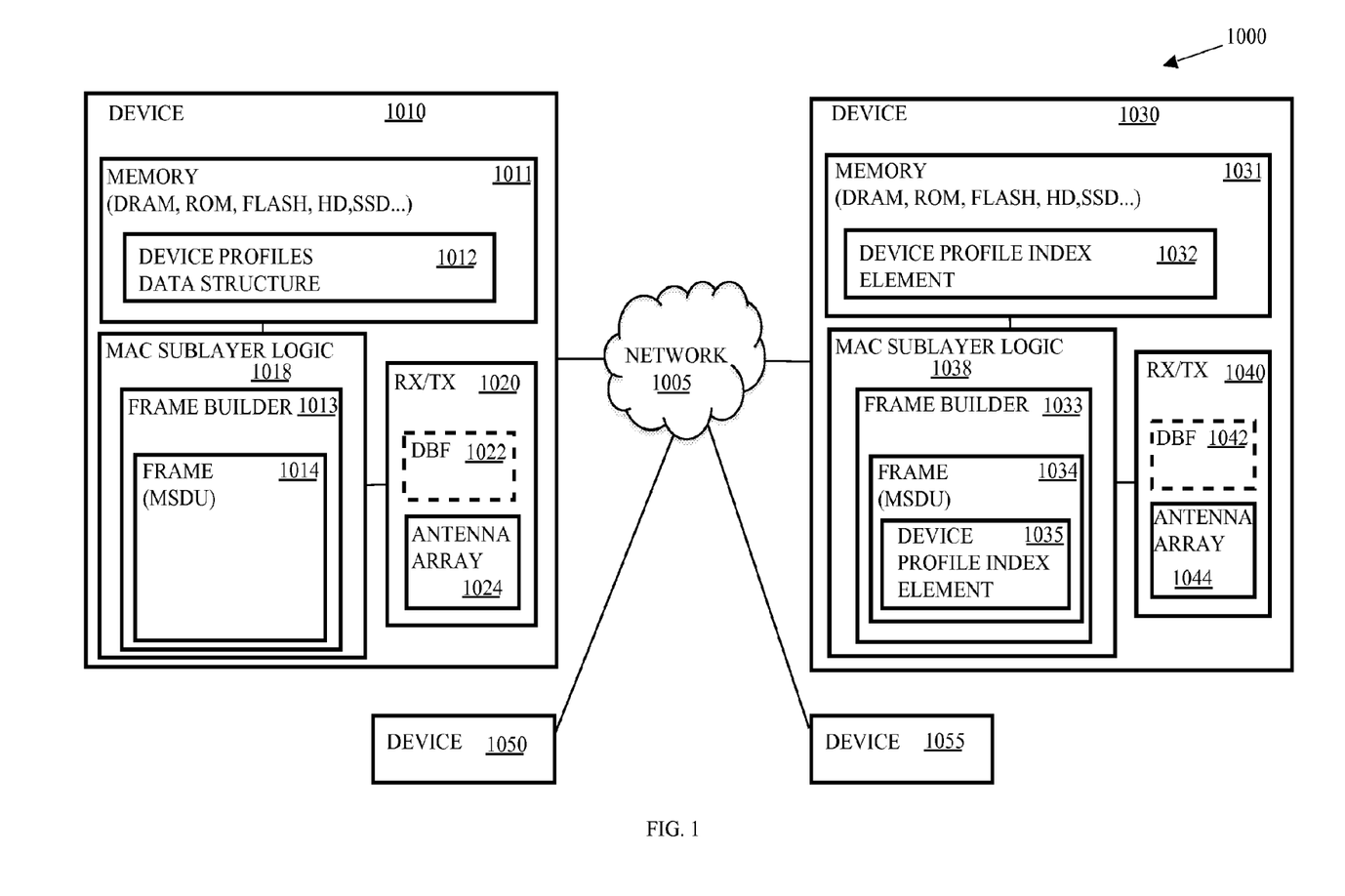
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter. Initially, communications device 1030 may receive a beacon from communications device 1010 and, thereafter send a communication comprising an association frame with a device profile index element 1035 to inform communications device 1010 of a device profile for communications device 1030. Periodically thereafter, the communications device 1030 may initiate communications with the metering substation to transmit data related to water usage. Furthermore, the metering station or other communications device may periodically initiate communications with the communications device 1030 in accordance with traffic parameters of the device profile for communications device 1030 to, e.g., update firmware of the communications device 1030. In other embodiments, the communications device 1030 may only respond to communications and may not comprise logic that initiates communications.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and medium access control (MAC) sublayer logic 1018 and 1038, respectively. The memory 1011 and 1031 may comprise a storage medium such as dynamic random access memory (DRAM), read only memory (ROM), flash memory, a hard disk drive, a solid-state drive, or the like. The memory 1011 and 1031 may store the frames, preambles, and preamble structures or portions thereof. The memory 1011 may comprise a device profiles data structure 1012 that comprises one or more device profiles for devices such as device 1030. The device profiles data structure 1012 may include an indexing structure to retrieve or look-up a device profile based upon a device profile index element such as a device profile index element 1032. The memory 1031 may comprise the device profile index element 1032 and, in some embodiments, may comprise custom parameters for the device profile of communications device 1030.

The MAC sublayer logic 1018, 1038 may comprise logic to implement functionality of the MAC sublayer of the data link layer of the communications device 1010, 1030. The MAC sublayer logic 1018, 1038 may generate the frames and pass the frames to physical layer (PHY) logic to generate physical layer protocol data units (PPDUs). More specifically, the frame builders 1013 and 1033 may generate frames and data unit builders of the PHY logic may encapsulate the frames with preambles to generate PPDUs for transmission via a physical layer device such as the transceivers (RX/TX) 1020 and 1040. The frames 1014 and 1034, also referred to as MAC layer Protocol Data Units (MPDUs), may comprise management, control, and data frames. In many embodiments, the frame builders 1013 and 1033 may generate frames 1014 and 1034 with device profile index elements 1015 and 1035. For example, frame builder 1033 may generate a management frame 1034 such as an association request frame to request an association with the access point such as the communications device 1010 or a reassociation request frame to request reassociation with the communications device 1010. The association request frame may comprise the device profile index element 1035 and may enable the communications device 1010 to allocate resources for and synchronize with the transceiver 1040. The association request frame may comprise information about the transceiver 1040 such as supported data rates and the service set identification (SSID) of the network with which the communications device 1030 wishes to associate.

After receiving the association request, the communications device 1010 determines whether to associate with the transceiver 1040, and, if accepted, reserves memory space and establishes an association identifier (AID) for the transceiver 1040. The communications device 1010 may determine the device profile index element 1035 from the association request frame and determine the device profile for the communications device 1030 by looking up the device profile in the device profiles data structure 1012. The communications device 1010 may look-up the device profile in the device profiles data structure 1012 by using the device profile index element 1035 as an index to the device profiles data structure 1012. The default values of the device profile for communications device 1030 may then be used unless custom parameters are set for the communications device 1030. The communications device 1030 may utilize traffic filter service (TFS) frames, flexible multicast service frames, directed multicast service frames, or other traffic related frames to present custom parameters for the device profile to communications device 1010.

The communications device 1010 may then respond to the association request with a management frame 1014 such as an association response frame or a reassociation response frame. The communications device 1010 may transmit the association response frame containing an acceptance or rejection notice to the transceiver 1040. If the communications device 1010 accepts the association with the transceiver 1040, the association response frame may include information regarding the association, such as the association identifier (AID) and the supported data rates.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a digital beam former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 1A:
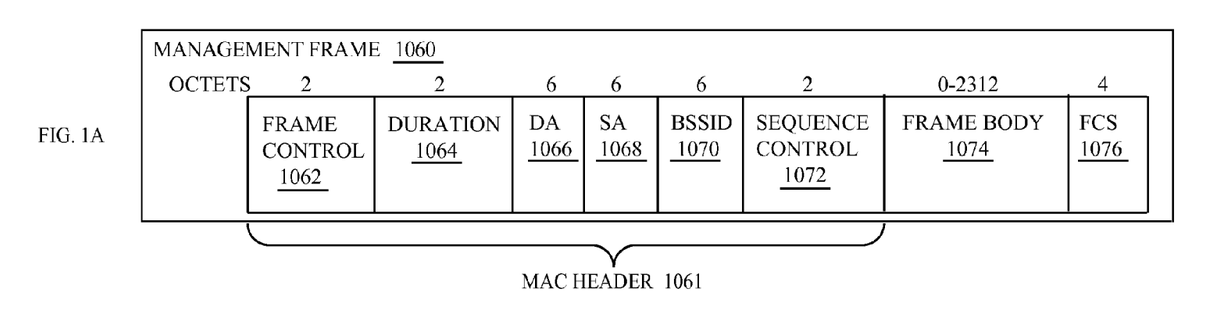
FIG. 1A depicts an embodiment of a management frame for establishing communications between wireless communication devices.

FIG. 1A depicts an embodiment of a management frame 1060 for establishing communications between wireless communication devices such as communications devices 1010, 1030, 1050, and 1055 in FIG. 1. The management frame 1060 may comprise a MAC header 1061 followed by a frame body 1074, and followed by a frame check sequence (FCS) 1076. The MAC header 1061 may comprise a frame control field 1062, a duration field 1064, a destination address (DA) field 1066, a source address (SA) field 1068, a basic service set identifier (BSSID) field 1070, and a sequence control field 1072. The frame control field 1062 may be two octets and may identify the type and subtype of the frame such as a management type and association subtype frame. The duration field 1064 may be two octets and may indicate a duration such as a network allocation vector (NAV). The DA field 1066 may be six octets and may identify the MAC address of the destination communications device. The SA field 1068 may be six octets and may identify the MAC address of the source communications device. The BSSID field 1070 may be six octets and may indicate the identifier for the basic service set. And the sequence control field 1072 may be two octets and may indicate a sequence number and fragment number of a MAC service data unit (MSDU).

Figure 1B:
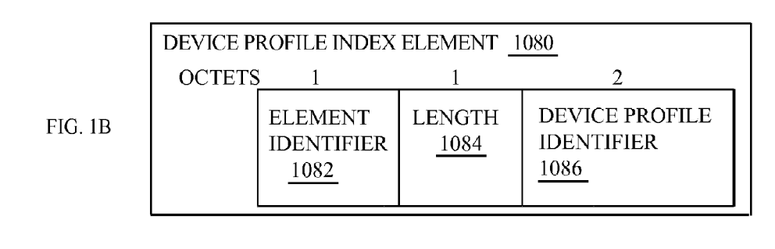
FIG. 1B depicts an embodiment of a device profile index element in the frame body of the management frame in FIG. 1A.

The frame body 1074 may be up to 2312 octets and may comprise a device profile index element such as the device profile index element 1080 illustrated in FIG. 1B. The FCS 1076 may comprise a cyclic redundancy check value such as an IEEE 32-bit cyclic redundancy check value. The cyclic redundancy check value is a value for use by an error-detecting cyclic redundancy code (CRC) to detect common types of errors on communication channels, providing quick and reasonable assurance of the integrity of communications received.

FIG. 1B depicts an embodiment of a device profile index element 1080 for the frame body 1074 of the management frame 1060 in FIG. 1A. The device profile index element 1080 may comprise an element identifier field 1082, a length 1084 field, and a device profile identifier field 1086. The element identifier field 1082 may be one octet and may identify the element 1080 as a device profile index element. The length field 1084 may be one octet and may identify the length of the device profile identifier field 1086. And the device profile identifier field 1086 may be two octets and may comprise data to identify a device profile for a communications device such as the communications device that includes the device profile identifier field 1086 in the frame body 1074 of a management frame 1060.

Figure 1C:
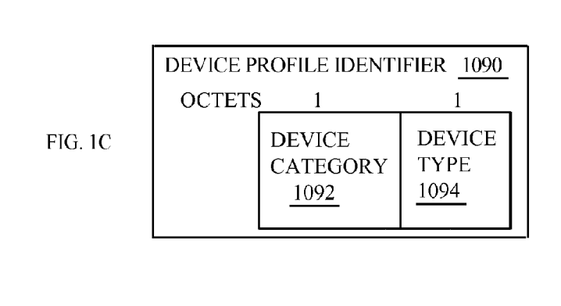
FIG. 1C depicts an embodiment of a device profile identifier field.

FIG. 1C depicts an embodiment of a device profile identifier field 1090 for establishing communications between wireless communication devices such as communications devices 1010. 1030, 1050, and 1055 in FIG. 1. The device profile identifier field 1086 of FIG. 1B may utilize a device profile identifier such as the device profile identifier field 1090 illustrated in FIG. 1C. The device profile identifier field 1090 may comprise two fields: a device category field 1092 and a device type field 1094. The device category field 1092 may be one octet and may identify the category within which the communications device falls, e.g., the communications device that creates the management frame 1060 comprising the device category field 1092. And the device type field 1094 may be one octet and may identify the type of device within the device category field 1092. For example, the device category field 1092 may comprise eight bytes of data that comprise an index for a device profiles data structure such as the device profiles data structure 1012 in FIG. 1 and the device type field 1094 may comprise eight bytes of data that comprise an index for a device profiles data structure such as the device profiles data structure 1012 in FIG. 1.

Figure 1D:
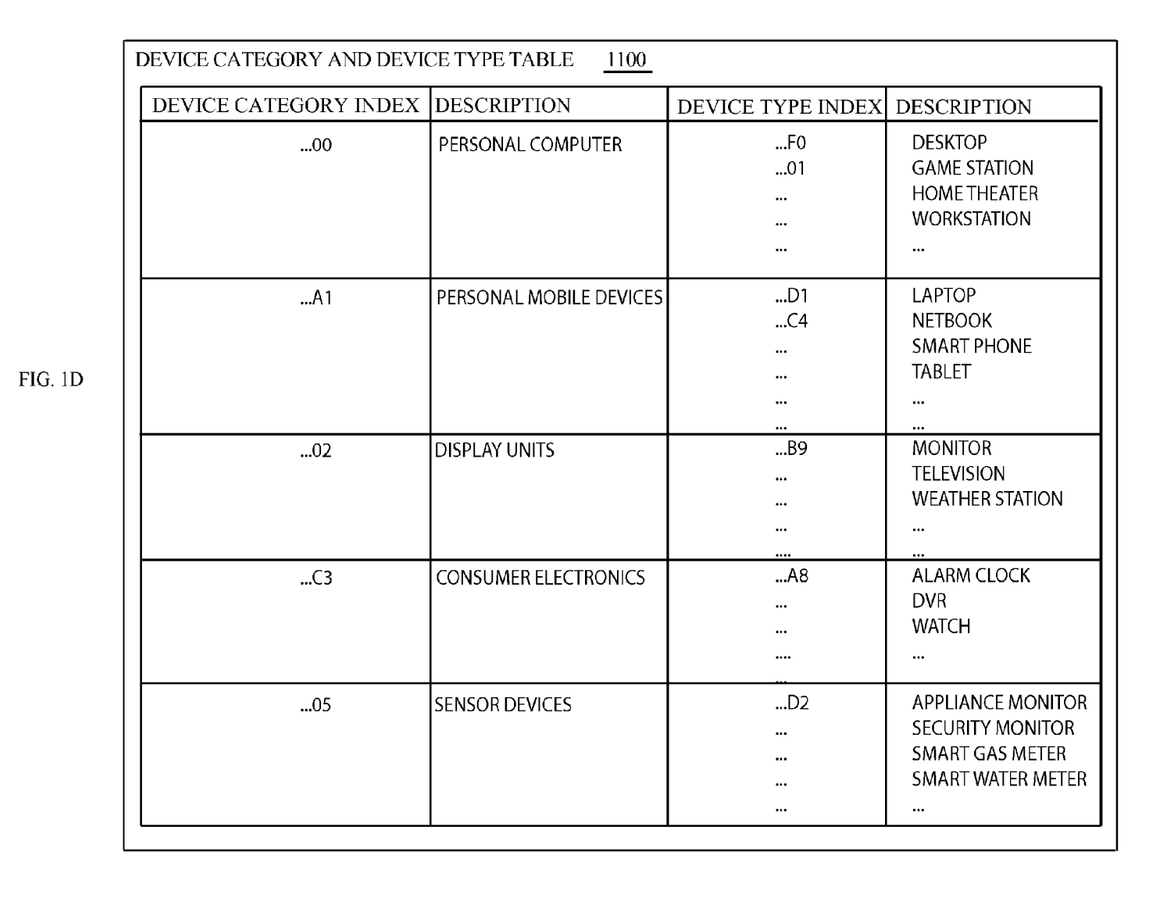
FIG. 1D depicts an embodiment of a device category and device type table for establishing communications between wireless communication devices.

FIG. 1D illustrates an embodiment of a device category and device type table 1100 for establishing communications between wireless communication devices. In particular, FIG. 1D illustrates a table of partial index values that for the device category field 1092 and the device type field 1094 in FIG. 1C. The index values are partial values to illustrate the values. Many embodiments may include eight byte values, four byte values, In particular, the device category index column may provide an index value such as a hexadecimal value indicative of the devices described in the adjacent description column. In some embodiments, the hexadecimal value represented in the device category index column may comprise the index to include in the device category field 1092 of FIG. 1C. Similarly, the device type index column may provide an index value such as a hexadecimal value indicative of the devices described in the adjacent description column. In some embodiments, the hexadecimal value represented in the device type index column may comprise the index to include in the device type field 1094 of FIG. 1C. Note that in the table 1100 illustrated, the device type index includes valid device types for the device category index in the same row. Note also that the values and descriptions in this table are for illustrative purposes and embodiments are not limited to index values and descriptions in this table 1100, but may, in fact, have completely different index numbers and descriptions.

To illustrate, Wi-Fi devices may be categorized as the following categories, but not limited to: Personal Computer, Personal mobile devices, Display Units, Consumer Electronic (CE) devices, Sensor devices, and the like. Each category may include specific device types. For example, the personal computer category may include specific types of personal computers such as desktops, game stations, home theater computers, workstations, and the like. The personal mobile device category may include specific types of personal mobile devices such as laptops, netbooks, smart phones, tablets, and the like. The display unit category may include specific types of display units such as monitors, televisions, weather stations, and the like. The consumer electronics category may include specific types of consumer electronics such as alarm clocks, digital video recorders (DVRs), watches, and the like. And the sensor devices category may include specific types of sensor devices such as appliance monitors, security monitors, smart gas meters, smart water meters, thermostats, water heater monitors, and the like. Other embodiments may organize the table 1100 different such as independent lists of device category indexes and device types indexes.

Figure 1E:
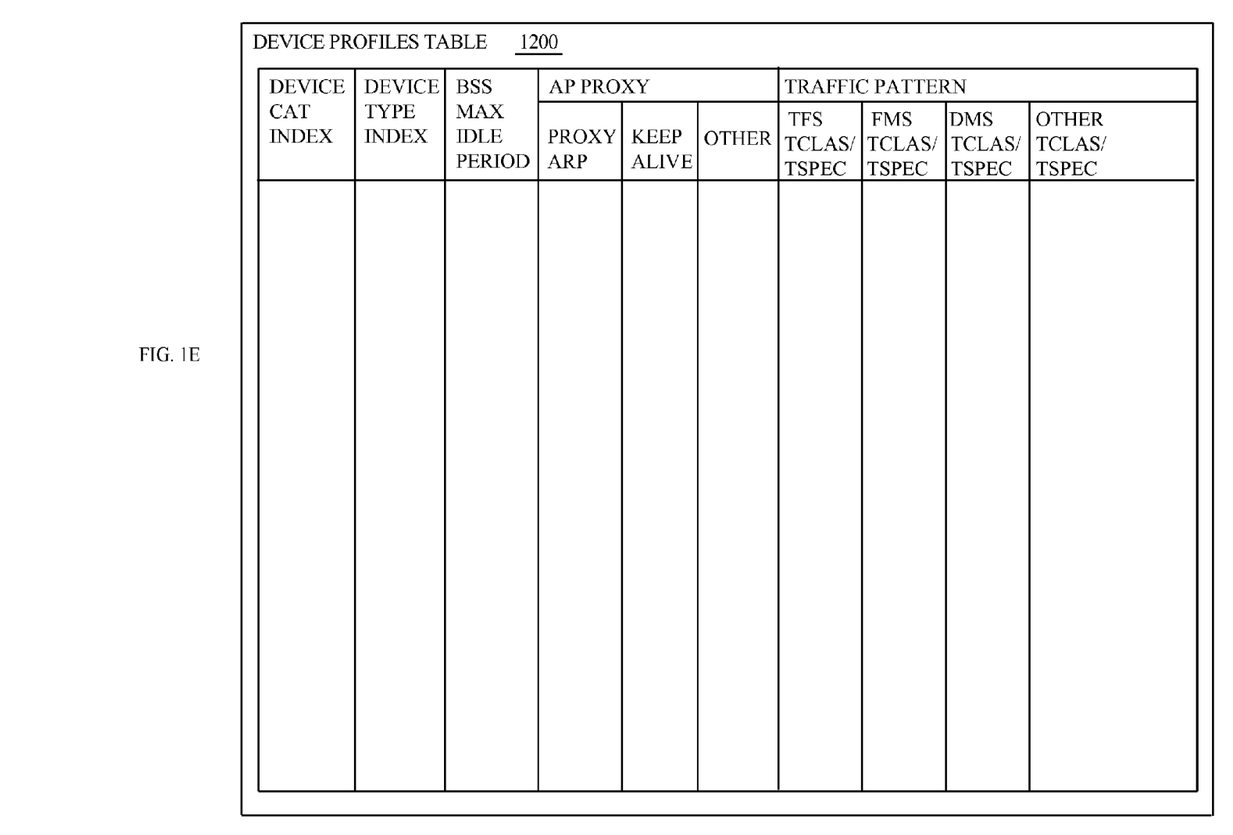
FIG. 1E depicts an embodiment of a device profiles data structure stored in memory of an access point for determining traffic characteristics for a communications device based upon a device profile identifier field.

FIG. 1E depicts an embodiment of a table 1200 including a device profiles data structure stored in memory of an access point such as the device profiles data structure 1012 illustrated in FIG. 1. The device profiles data structure may facilitate determination of connectivity and/or traffic parameters to associate with a communications device based upon a device profile identifier field such as the device profile identifier field 1090 illustrated in FIG. 1C. In some embodiments, a device profile may be defined for each of device category and device type and the device category and device type field values may be utilized as indexes to look up the device profile for a particular communications device.

The device profile may include a set of common category parameters and a set of device type specific parameters. In the present embodiment, the device profiles may be comprised of the following items: a device category index; a device type index; a basic service set (BSS) maximum (max) idle period field defining a BSS max idle period value for the device category; and an access point (AP) Proxy field specifying the traffic type that access point should respond to on behalf of a communications device. The device category index and the device type index fields may comprise values indicative of a device category and device type such as the categories and types illustrated in FIG. 1D. The BSS max idle period may enable an access point to indicate a time period during which the access point does not disassociate a communications device due to non-receipt of frames from the communications device. For example, the BSS max idle period may be set to a large value for fixed, battery-powered devices so that these devices can enter sleep mode for longer periods of time and the BSS max idle period may be set to a small value for mobile devices so that the network remains updated when the devices, e.g., roam between areas associated with different access points.

The AP Proxy columns may describe events in which the access point may act as a proxy for an associated communications device such as network maintenance traffic. The present embodiment includes an access point proxy field that defines the traffic type that an access point should respond to on behalf of a station for the device type in the device category. The AP proxy may include a bit for a proxy address resolution protocol traffic, a bit for keep alive traffic, and one or more bits for other network maintenance traffic. The proxy address resolution protocol traffic column may comprise traffic in which a router node or access point may receive traffic on behalf of the communications device and may forward the traffic to the communications devices at a later point in time. The proxy address resolution protocol traffic may be set to a logical one to indicate that the access point should respond on behalf of the communications device for address resolution protocol traffic.

The keep alive traffic column may comprise traffic from other devices that require a response from the communications device to verify that the link between the other device and the communications device is good or should be preserved. If the keep alive bit is set to a logical one, the access point may respond to keep alive traffic on behalf of the communications device.

The other traffic column may include, e.g., simple network management protocol (SNMP) traffic for managing devices on Internet Protocol networks. The SNMP traffic may be used in network management systems to monitor network-attached devices for conditions that warrant administrative attention so the access point may respond to such traffic on behalf of the communications device.

According to some embodiments, the device profile may also define traffic pattern columns, so that access point can do some operations on behalf of the communications device: traffic classification (TCLAS) and traffic specifications (TSPEC) parameter setting for Traffic Filter Service (TFS) column; TCLAS and TSPEC parameter setting for Flexible Multicast Service (FMS) column; and/or TCLAS TSPEC parameter setting for Directed Multicast Service (DMS) column. The TCLAS parameters include information that contains a set of parameters necessary to identify incoming MSDUs with a particular traffic stream to which they belong. The TSPEC parameters include a set of parameters that define characteristics and quality of service (QoS) expectations of a traffic flow.

The TFS is a service in which an access point does not transmit all incoming frames to the associated communications device, but transmits only a frame corresponding to a predetermined condition. Transmitting only frames meeting a predetermined condition rather than all frames to the communications device may prevent unnecessary traffic from occurring, thereby enhancing the efficiency of usage of radio resources and reducing the power consumption.

The FMS is a service in which a communications device may request individual service for multicast traffic. The FMS may identify a set of multicast streams and allow tailoring of the delivery interval, as a number of delivery traffic indication messages (DTIMs), and the data rate to be used.

The DMS is a multicast-to-unicast conversion service. The feature delivers selected or identified multicast streams as unicast traffic by the access point to the communications device. The benefits may include increased reliability, as unicast is acknowledged and automatically retransmitted, and savings in airtime.

In some embodiments, the other TCLAS/TSPEC traffic may include, e.g., any QoS related TCLAS/TSPEC traffic. In further embodiments, if the communications device determines to customize the device profile settings, the communications device may use TFS, FMS, DMS Request and Response frames to have a set of customized parameters set at the access point.

Rows of the device profiles table 1200 may comprise device profiles. The device profiles may comprise default values for devices in a particular category of a particular device type. In other embodiments, the device profiles table may comprise more parameters, less parameters, different parameters, or some combination thereof. The device profiles, in some embodiments, are not limited to a particular type of parameter.

Figure 2:
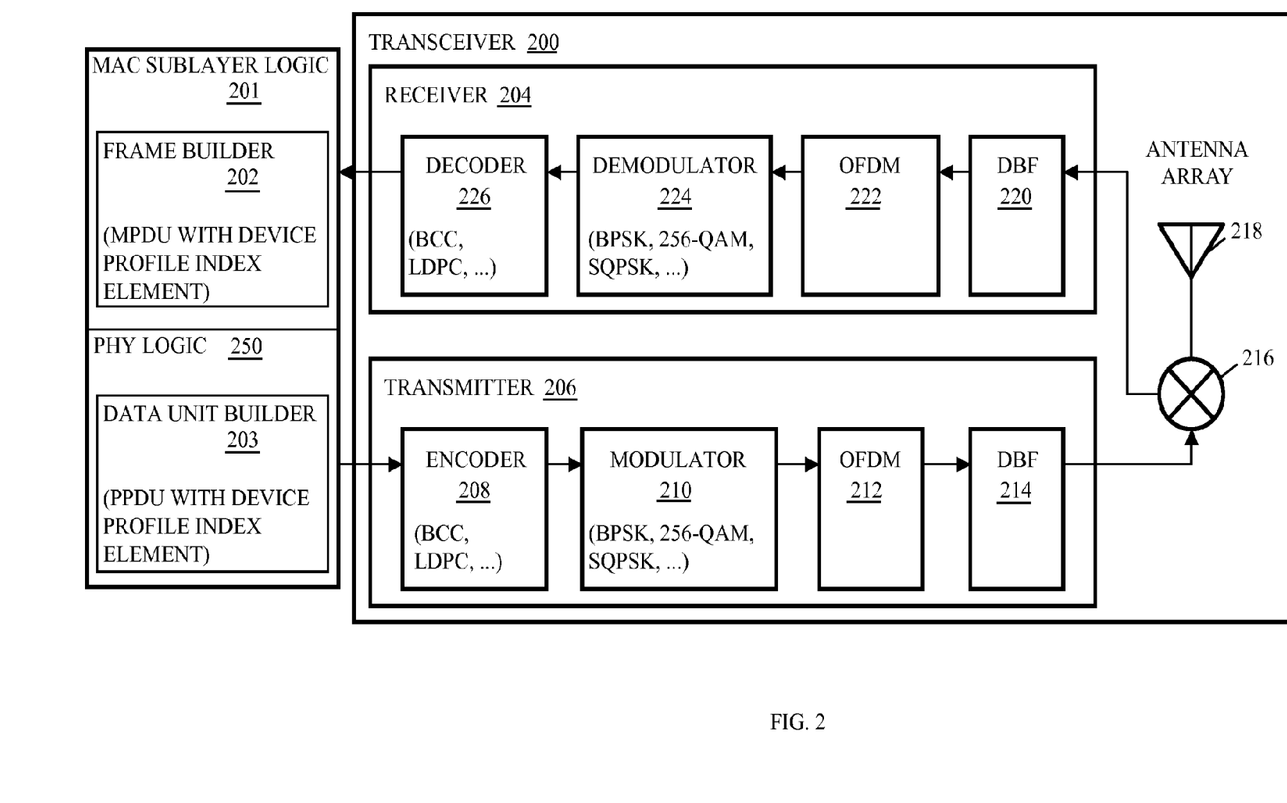
FIG. 2 depicts an embodiment of an apparatus to generate, transmit, receive and interpret a device profile index element in a frame.

FIG. 2 depicts an embodiment of an apparatus to generate, transmit, receive, and interpret a device profile index element in a frame. The apparatus comprises a transceiver 200 coupled with medium access control (MAC) sublayer logic 201 and physical layer (PHY) logic 250. The MAC sublayer logic 201 may encapsulate a MAC service data unit (MSDU) to generate a MAC protocol data unit (MPDU) to transmit to the PHY logic 250 and the PHY logic 250 may generate a PPDU with one or more MPDUs to transmit via transceiver 200.

In many embodiments, the MAC sublayer logic 201 may comprise a frame builder 202 to generate a frame to pass to the PHY logic 250 as an MPDU with a device profile index element. The device profile index element may comprise data indicative of a particular device profile maintained by an access point such as communications device 1010 in FIG. 1. For example, a frame builder 202 may generate a frame including a type field that specifies, e.g., the frame is a management frame and a subtype field to specify the function of the frame. A management frame may comprise, e.g., a Beacon, Probe Request, Probe Response, Association Request, Association Response, Reassociation Request, and Reassociation Response frame subtype. The duration field that follows the first frame control field specifies the duration of this transmission. The duration field may include the Network Allocation Vector (NAV), which can be used as a protection mechanism for communications. An address field may follow the duration field, specifying the address of the intended receiver or receivers for this transmission. And a device profile index element indicative of a device profile for, e.g., a sensor that is an appliance monitor.

The PHY logic 250 may comprise a data unit builder 203. The data unit builder 203 may determine a preamble to encapsulate the MPDU to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a digital beam former (DBF) 214. The encoder 208 of transmitter 206 receives and encodes data destined for transmission from the MAC sublayer logic 201 with, e.g., a binary convolutional coding (BCC), a low-density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. In some embodiments, the output of the modulator 210 is fed to the OFDM through a space-time block coding (STBC). And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a DBF 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a dynamic random access memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing.

For embodiments in which the MAC sublayer logic 201 is part of an access point, the MAC sublayer logic 201 may parse the MPDU to determine device profile index element such as the device profile index element 1080 illustrated in FIG. 1B. The MAC sublayer logic 201 may then utilize the indicated device category and device type to determine a device profile from a device profiles data structure such as the device profiles table 1200 illustrated in FIG. 1E. Based upon the device profile, the access point may set parameters associated with the corresponding communications device to determine subsequent interaction with the corresponding communications device.

Figure 3:
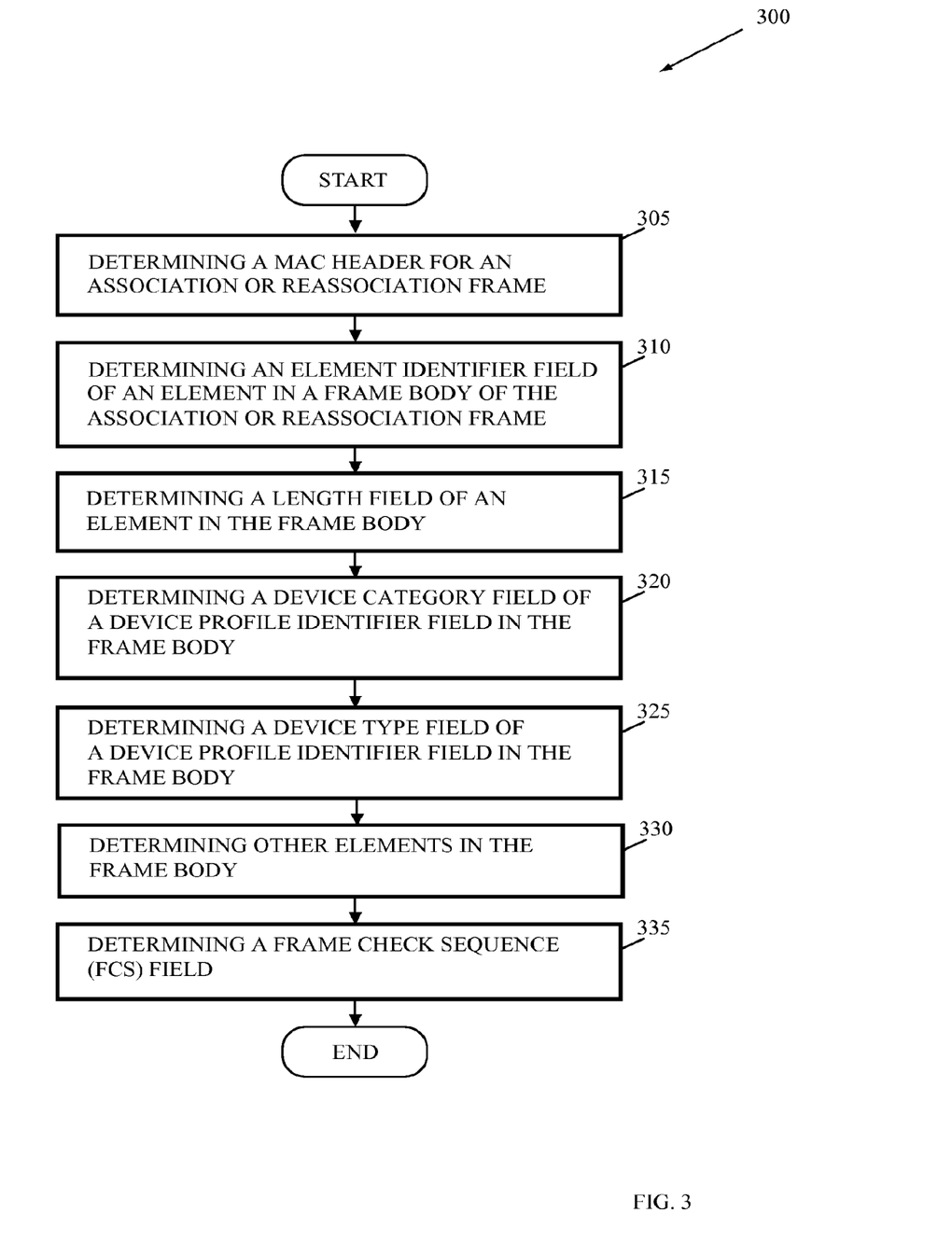
FIG. 3 depicts an embodiment of a flowchart to generate a frame with a device profile index element.

FIG. 3 depicts an embodiment of a flowchart 300 to generate a frame with a device profile index element. The flowchart 300 begins with a medium access control (MAC) sublayer logic determining a MAC header for an association or reassociation frame (element 305). For instance, the MAC sublayer logic may determine a header comprising a frame control indicative of a management type frame and an association or reassociation request subtype frame.

The MAC sublayer logic may determine an element identifier field of an element in a frame body of the association or reassociation request frame (element 310). The element identifier field may provide data to identify an element in which the succeeding fields conform with a device profile index element. The MAC sublayer logic may determine a length field of the element of the frame body (element 315), determine the device category field of the frame body (element 320), and determine the device type field of the frame body (element 325). In many embodiments, determining the element identifier field, the length field, and the device profile identifier field (including the device category field and the device type field) may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the element identifier field, the length field, and the device profile identifier field may be hardcoded into the MAC sublayer logic or otherwise available for insertion into a frame. In still other embodiments, the MAC sublayer logic may generate the device profile index element based upon access to indications of the values for each.

In some embodiments, the MAC sublayer logic may determine other elements of the frame body (element 330). For instance, some elements may be inserted prior to the device profile index element and some elements may be inserted after the device profile index element. Other elements may include, for example, supported rates, extended supported rates, power capability, supported channels, QoS capability, and vendor specific parameters. For reassociation request frames, the frame body may also include the current access point address.

After determining the frame body, the MAC sublayer logic may determine a frame check sequence (FCS) field value (element 335) to provide for error corrections at the access point.

Figure 4A:
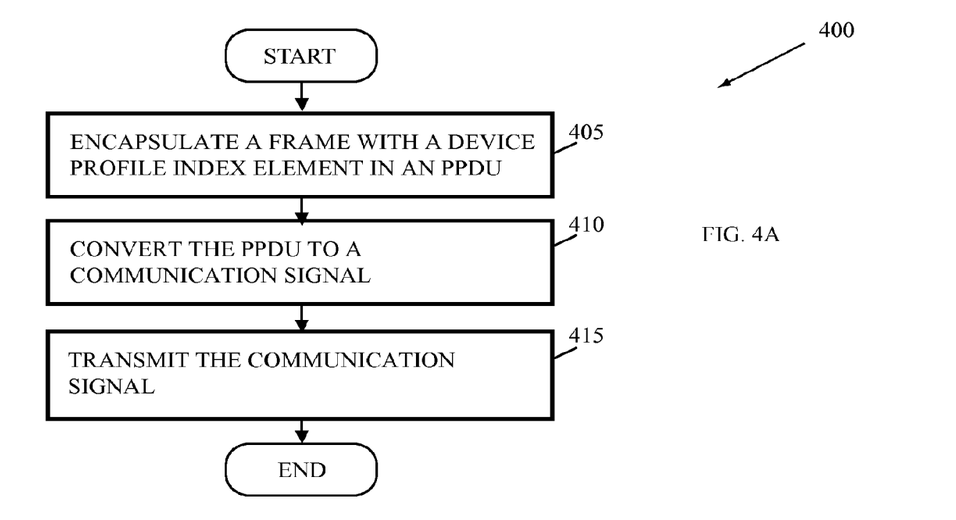
FIGS. 4A-B depict embodiments of flowcharts to transmit, receive, and interpret communications with a device profile index element as illustrated in FIG. 2.
Figure 4B:
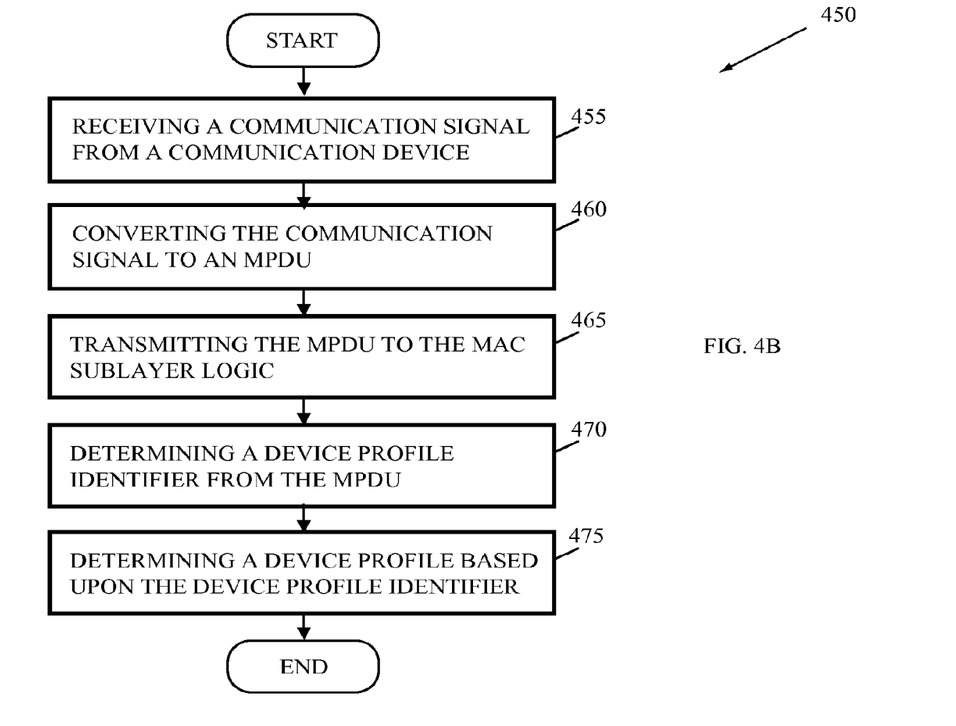

FIGS. 4A-B depict embodiments of flowcharts 400 and 450 to transmit, receive, and interpret communications with a device profile index element as illustrated in FIG. 2. Referring to FIG. 4A, the flowchart 400 may begin with receiving a frame from the frame builder comprising a device profile index element indicative of a device category and a device type associated with a communications device. The MAC sublayer logic of the communications device may generate the frame as a management frame to transmit to an access point and may pass the frame as an MPDU to a data unit builder that transforms the data into a packet that can be transmitted to the access point. The data unit builder may generate a preamble to encapsulate the PSDU (the MPDU from the frame builder) to form a PPDU for transmission (element 405). In some embodiments, more than one MPDU may be encapsulated in a PPDU.

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

Referring to FIG. 4B, the flowchart 450 begins with a receiver of an access point such as the receiver 204 in FIG. 2 receiving a communication signal via one or more antenna (s) such as an antenna element of antenna array 218 (element 455). The receiver may convert the communication signal to an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine a device profile identifier from the MPDU (element 470) such as the device profile identifier 1090 in FIG. 1C. For instance, the MAC sublayer logic may parse the frame to determine the frame body and parse or decode the frame body to determine the device profile index element. The MAC sublayer logic may then parse or decode the device profile index element based upon a frame structure for the device profile index element stored in memory and determine data indicative of the device category and device type such as the device profile identifier.

Then the MAC sublayer logic may determine a device profile to associate with the communications device that is the source of the communications signal and the device profile identifier based upon the device profile identifier (element 475). For example, the MAC sublayer logic may parse or decode the device profile identifier based upon the structure for the device profile identifier in memory of the access point and determine, e.g., the device category and device type associated with the communications device that is the source of the communications signal. The MAC sublayer logic may utilize the device profile identifier to identify the device profile in a device profile data structure that is accessible by the access point, e.g., because the device profile data structure resides in memory of the access point. Utilizing the device profile identifier to identify the device profile may involve looking up or identifying a record in the device profile data structure comprising the device profile by using the device category and device type as indexes to the device profile data structure.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates a device profile index element to communicate a device profile to another communications device. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
   determining, by a medium access control sublayer logic, data to indicate if a communications device is a sensor;
   determining, by the medium access control sublayer logic, data for a specific type of the communications device to indicate if the communications device is designed for services comprising healthcare, home, or security monitoring;
   generating, by the medium access control sublayer logic, a frame comprising the data to indicate if the communications device is a sensor; and the data for a specific type of the communications device to indicate if the communications device is designed for services comprising healthcare, home, or security monitoring;
   creating, by a physical layer logic, a physical layer protocol data unit with the frame and a preamble to transmit; and
   transmitting, by an antenna, the frame with a preamble.

2. The method of claim 1, further comprising storing, by the medium access control sublayer logic, at least part of the frame in memory.

3. The method of claim 1, wherein the frame comprises a device profile index element to associate the communications device with a device profile, wherein the device profile index element comprises data indicative of a device category and a device type.

4. The method of claim 3, wherein generating the frame comprises generating the frame with the device profile index element in a frame body of the frame of an association request.

5. The method of claim 3, wherein generating the frame comprises generating the frame with the device profile index element comprising an element identifier field, a length field, and a device profile identifier.

6. The method of claim 5, wherein generating the frame with the device profile index element comprises generating the frame with the device profile identifier comprising a device category field to indicate the device category and a device type field to indicate the device type.

7. The method of claim 6, wherein generating the frame with the device profile index element comprises generating the frame with the device profile identifier comprising the device category field that is eight bytes in length and the device type field that is eight bytes in length.

8. A communication device, comprising:
a memory;
a medium access control sublayer logic coupled to the memory to determine data to indicate if the communications device is a sensor; and to determine data for a specific type of the communications device to indicate if the communications device is designed for services comprising healthcare, home, or security monitoring; to generate a frame comprising the data to indicate if the communications device is a sensor; and the data for a specific type of the communications device to indicate if the communications device is designed for services comprising healthcare, home, or security monitoring;
a physical layer logic coupled to the memory to prepend the frame with a preamble to create a physical layer protocol data unit to transmit; and
a transmitter coupled with the medium access control sublayer logic to transmit the frame.

9. The device of claim 8, wherein the medium access control sublayer logic is coupled with the memory to store at least a portion of the frame.

10. The communications device of claim 8, wherein the frame comprises a device profile index element to associate the communications device with a device profile, wherein the device profile index element comprises data indicative of a device category and a device type.

11. The device of claim 10, further comprising an antenna coupled with the transmitter to transmit the frame.

12. The device of claim 10, wherein the medium access control sublayer logic comprises logic to generate the frame with the device profile index element in a frame body of the frame of an association request.

13. The device of claim 10, wherein the medium access control sublayer logic comprises logic to generate the frame with the device profile index element comprising an element identifier field, a length field, and a device profile identifier.

14. The device of claim 13, wherein the medium access control sublayer logic comprises logic to generate the frame with the device profile identifier comprising a device category field to indicate the device category and a device type field to indicate the device type.

15. The device of claim 13, wherein the medium access control sublayer logic comprises logic to generate the frame with the device profile identifier comprising a device category field that is eight bytes in length and a device type field that is eight bytes in length.

16. One or more non-transitory computer readable media comprising instructions to, upon execution of the instructions by a processor of a wireless station (STA) configured to operate in a wireless network, cause the wireless STA to:
determine, by a medium access control sublayer logic of the wireless STA, data to indicate if the wireless STA is a sensor;
determine, by the medium access control sublayer logic, data for a specific type of the wireless STA to indicate if the wireless STA is designed for services comprising healthcare, home, or security monitoring;
generate, by the medium access control sublayer logic, a frame comprising the data to indicate if the wireless STA is a sensor; and the data for a specific type of the wireless STA to indicate if the wireless STA is designed for services comprising healthcare, home, or security monitoring;
create, by a physical layer logic, a physical layer protocol data unit with the frame and a preamble to transmit; and
transmit, by an antenna, the frame with the preamble.

17. The one or more non-transitory computer readable media of claim 16, wherein the frame comprises a device profile index element to associate the wireless STA with a device profile, wherein the device profile index element comprises data indicative of a device category and a device type.

18. The one or more non-transitory computer readable media of claim 17, wherein the instructions further cause the wireless STA to store, by the medium access control sublayer logic, at least part of the frame in memory.

19. The one or more non-transitory computer readable media of claim 18, wherein the instructions to cause the wireless STA to generate the frame comprises instructions to cause the wireless STA to generate the frame with the device profile index element in a frame body of the frame of an association request.

20. The one or more non-transitory computer readable media of claim 18, wherein the instructions to cause the wireless STA to generate the frame comprises instructions to cause the wireless STA to generate the frame with the device profile index element comprising an element identifier field, a length field, and a device profile identifier.

* * * * *